No. 617,400.  
Patented Jan. 10, 1899.
C. KILLING.
PROCESS OF PURIFYING RAW ALCOHOL FROM ALDEHYDE.
(Application filed May 8, 1897.)
(No Model.)
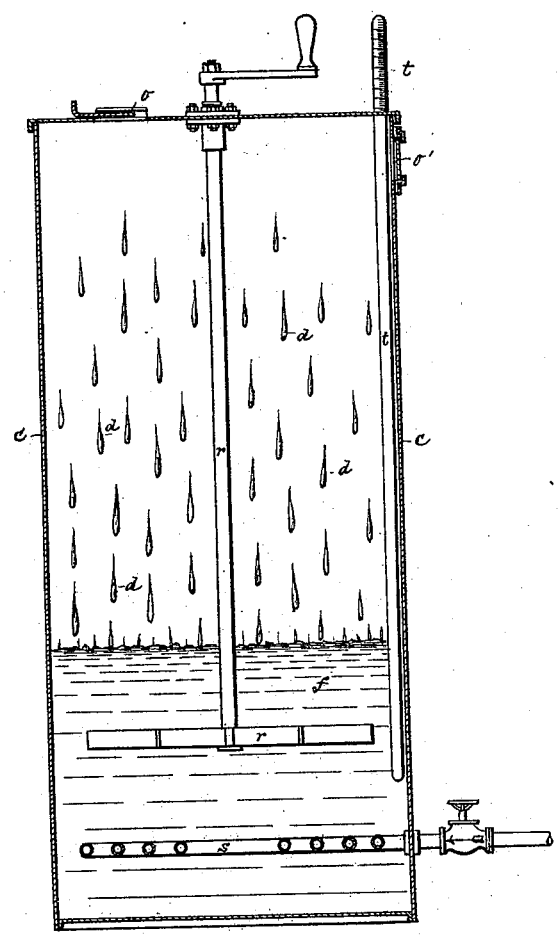
Witnesses:
William Schulz.
William Miller.
Inventor:
Carl Killing,
by his attorneys
Roeder & Briesen

UNITED STATES PATENT OFFICE.

CARL KILLING, OF DUSSELDORF, GERMANY.

PROCESS OF PURIFYING RAW ALCOHOL FROM ALDEHYDE.

SPECIFICATION forming part of Letters Patent No. 617,400, dated January 10, 1899.

Application filed May 8, 1897. Serial No. 635,691. (No specimens.)

*To all whom it may concern:*

Be it known that I, CARL KILLING, a subject of the German Emperor, residing at Dusseldorf, Germany, have invented certain new and useful Improvements in Processes of Purifying Raw Alcohol from Aldehyde, (for which I have obtained the following patents: in Germany, No. 91,806, dated May 30, 1896; in France, No. 261,433, dated May 19, 1896; in Belgium, No. 125,197, dated December 15, 1896; in Austria, No. 43/623, dated December 15, 1896, and in Hungary, No. 14,668, dated December 18, 1896,) of which the following is a specification.

This invention relates to a process for removing aldehyde from unrectified alcohol or first runnings in a gaseous form, while the vaporized ethyl alcohol is recondensed and returned in a liquid form, so that any practical loss of the latter is avoided.

The accompanying drawing represents a vertical longitudinal section of one form of apparatus for carrying my invention into effect.

In the drawing the letter $c$ represents an upright receptacle partly filled with unrectified alcohol or first runnings $f$, which is heated by a steam-coil $s$. An opening $o'$ is formed in the side of the receptacle $c$ near the upper end thereof, and a second opening $o$ is formed in the cover diametrically opposite the opening $o'$. Owing to the difference in the elevations of these two openings a natural weak air-draft will pass through the upper part of the receptacle, the air entering at the side opening and escaping through the top opening. The receptacle is provided with an agitator $r$, which may be operated by a hand-crank or otherwise and is adapted to stir the liquid, while a thermometer $t$ serves to indicate the temperature of the latter. If the liquid is heated to 100° to 113° Fahrenheit, not only aldehyde, having a boiling-point of 68° Fahrenheit, but also ethyl alcohol, is slowly evaporated, although the boiling-point of the latter lies at 174° Fahrenheit; but the proportion of the components of the vapor changes in such a way that while the lower strata of the vapors contain a large quantity of alcohol the upper strata contain less and less, so that finally almost pure aldehyde and very little alcohol is contained beneath the cover. The alcohol will continually descend along the wall of the vessel $c$ in the form of tears and streamlets $d$ and will return to the body of the liquid, while the aldehyde is discharged by the weak air-draft through opening $o$ into the atmosphere.

The drawing shows the vaporizing-chamber $c$ to be of cylindrical form; but this is not essential, the requirements being only that such chamber should be of considerable height.

The cause of the separation is found in the different boiling-points of the components, in the different vapor-tension, the different evaporating velocity, and in the different expanding velocity of the vapors within the vaporizing-chamber.

The term "first runnings," as used in this specification, embraces the first products of redistillation or rectification of unrectified alcohol, which contain besides the ethyl alcohol the easily volatile substances, such as aldehyde, while the latter products of distillation contain the less volatile substances, such as fusel.

The invention is therefore not only applicable for the treatment of unrectified alcohol, but also for the treatment of the products rich in aldehyde obtained from the second distillation or so-called "rectification."

What I claim is—

The process of removing aldehyde from unrectified alcohol or first runnings, which consists in slowly evaporating the liquid at a temperature between 100° to 113° Fahrenheit within a high chamber, in which the composition of the vapor so changes in strata by reason of the unequal expansion of its component parts that aldehyde in a gaseous form is contained in the uppermost stratum, conducting an air-current through the upper end of the chamber to carry off such gaseous aldehyde, and returning the condensed alcohol-vapors of the lower strata to the body of the liquid, substantially as specified.

In testimony whereof I have signed this specification in the presence of two subscribing witnesses.

CARL KILLING.

Witnesses:
ERNEST ANDRÉ,
WILLIAM ESSENWEIN.